Dec. 15, 1970    A. A. SCHAEFFER    3,546,805
PORTABLE FISHING POLE HOLDER AND ALARM
Filed Aug. 29, 1968    2 Sheets-Sheet 1

INVENTORS
ALLEN A. SCHAEFER

BY    Peck & Peck
ATTORNEYS

Dec. 15, 1970     A. A. SCHAEFFER     3,546,805
PORTABLE FISHING POLE HOLDER AND ALARM
Filed Aug. 29, 1968     2 Sheets-Sheet 2

INVENTOR
ALLEN A. SCHAEFER

BY     Peck & Peck
ATTORNEYS

United States Patent Office 3,546,805
Patented Dec. 15, 1970

3,546,805
PORTABLE FISHING POLE HOLDER AND ALARM
Allen A. Schaefer, 584 Matthews Drive,
Cincinnati, Ohio 45215
Filed Aug. 29, 1968, Ser. No. 756,167
Int. Cl. A01k 97/10, 97/12
U.S. Cl. 43—17      4 Claims

ABSTRACT OF THE DISCLOSURE

A portable fishing pole holder and fish alarm comprising a rigid frame stand having one or more fishing pole holders pivotally mounted thereon. Audible and visual alarms are associated with the pole holders so that when a pole holder is pivoted by the pull of a fish, contact is made by the pole holder with an electrical terminal to actuate the alarms.

---

This invention relates broadly to the art of portable means for holding the handle ends of fishing poles, and in its more specific aspects it relates to a portable fishing rod holder which is pivotally mounted to cause operation of a visual and audible alarm when the holder is caused to pivot under the action of a caught fish; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

In the usual manner of fishing with a pole, the fisherman stands or sits on the edge of the body of water holding the pole over the water, and the fish line from the pole extends into the water with the fish hook on the end thereof. When a fisherman fishes in this manner, he cannot set the pole on the bank of the body of water with the line and hook in the water and know whether or not a fish has taken hold of the hook, and this is particularly the case when the fisherman wishes, for one reason or another, to leave the fishing pole and go to some spot relatively remote therefrom. Another danger in this course of procedure resides in the possibility that a fish will become hooked onto the hook and pull the entire pole into the water. Without any equipment on the general order of that embodied in this innovation the fisherman may only fish with one pole and is not able to know the condition of a plurality of poles at one time.

These, and other undesirable features which are inherent in the normal manner of fishing, have been overcome by my invention, for I have provided a portable apparatus which is adapted to hold one or a plurality of fishing rods in operative positions with the lines and hooks in the water, and for providing means on the apparatus to indicate to the fisherman when any one of the hooks have been taken by a fish, so that the fisherman may fish with a plurality of poles, and may also leave the poles, and yet be notified automatically when a fish has been caught by one or more of the poles.

In the development of this fishing pole holder and alarm it has been one of my purposes to provide a portable device which is easily carried from place to place, due to the ingenious construction thereof, and the device is sturdy and the various components thereof are so related and connected together that it will withstand relatively rough handling, and long and continuous use.

The device involves a framework comprising reinforcing elements and elements which function to mount and control the various alarm indicators.

The alarm indicators are automatically electrically operated when a fish has been hooked, and I have provided a casing for batteries which is so mounted on the framework that the batteries will not be damaged or disconnected under rough handling of the entire device. Likewise, I preferably provide a case for tackle, or the like, and this is also mounted in a manner to prevent damage to the contents of the case when the device is subjected to relatively rough usage.

In achieving the above, and other highly advantageous and desirable results, I have not sacrificed economy of production or overlooked the advantage of keeping the weight of the device low.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings.

Figure 1:
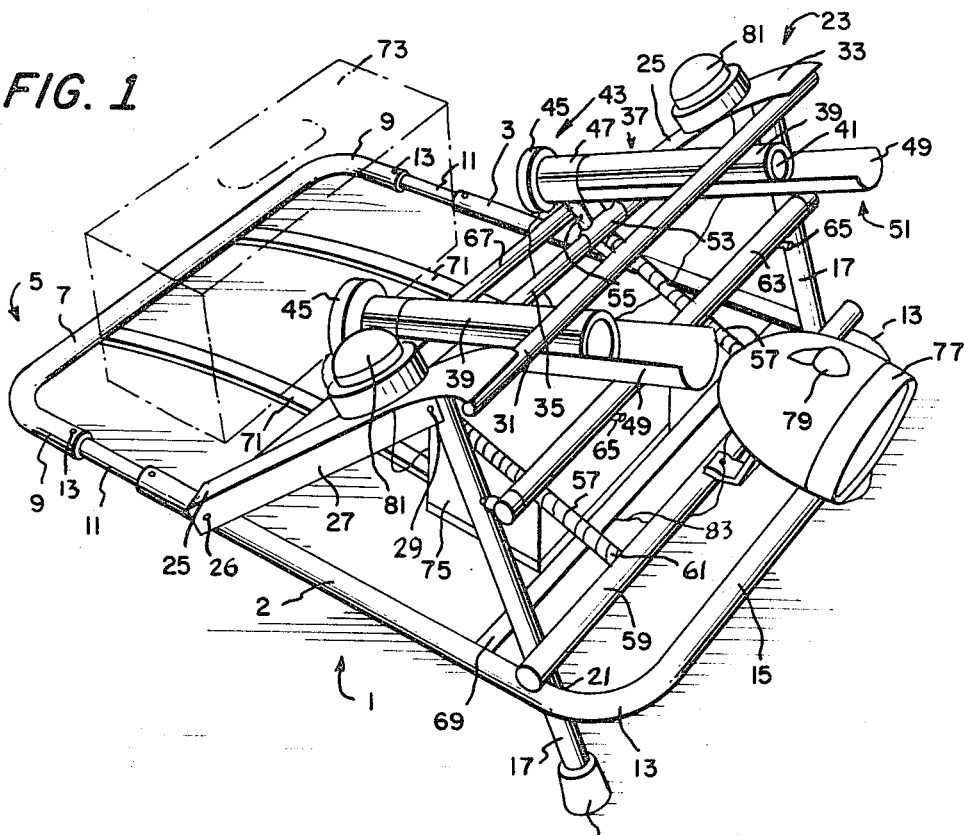
FIG. 1 is a view in perspective of the portable fishing pole holder and alarm.

In the accompanying drawings, I have used the numeral 1 to designate the basic frame of the device, and this frame is of generally rectangular configuration comprising oppositely disposed fore and aft extending side members 3 which are connected together at their rear ends by a member designated generally by the numeral 5. The member 5 comprises a transverse length or rod 7 which is bent at each end providing a forwardly-extending connecting arm 9 extending forwardly at each end of the member 7. The frame 1 and the member 5 are preferably formed of any suitable type of metal and may be of tubular construction. The fore and aft extending members 3 are the same diameter as the forwardly-extending connecting arms 9, and the rear ends of the fore and aft extending members 3 of the basic frame 1 having extensions 11 of lesser diameter which are preferably telescopically received in the open ends of the arms 9. Set screws 13 may be employed to maintain the extensions 11 of the fore and aft extending members 3 in proper position mounted within the forwardly-extending connecting arms 9. The forward end of each fore and aft extending arm 3 is inwardly bent as at 13 to provide a front transversely-extending member 15.

It is to be understood that the basic frame 1, including the rear ground supporting member 5, and the members 3 and 15 may be formed as an integral structure, and still fall within the spirit and scope of the invention.

Figure 2:
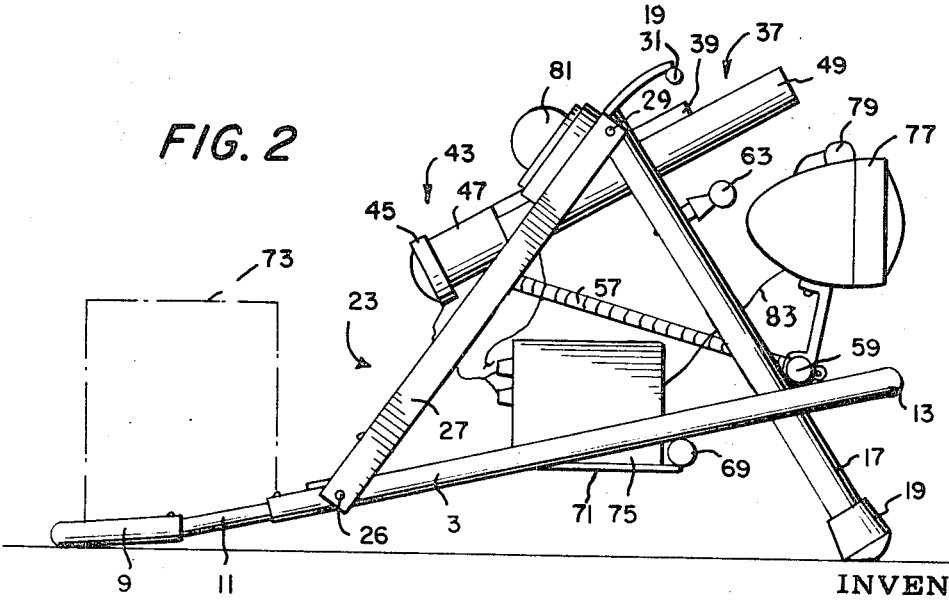
FIG. 2 is a view in side elevation of the device illustrated in FIG. 1.
Figure 3:
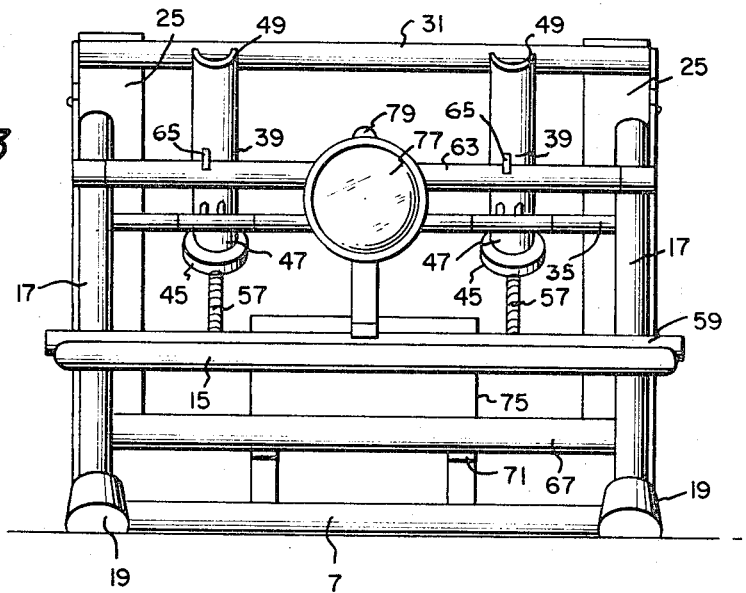
FIG. 3 is a view in front elevation.
Figure 4:
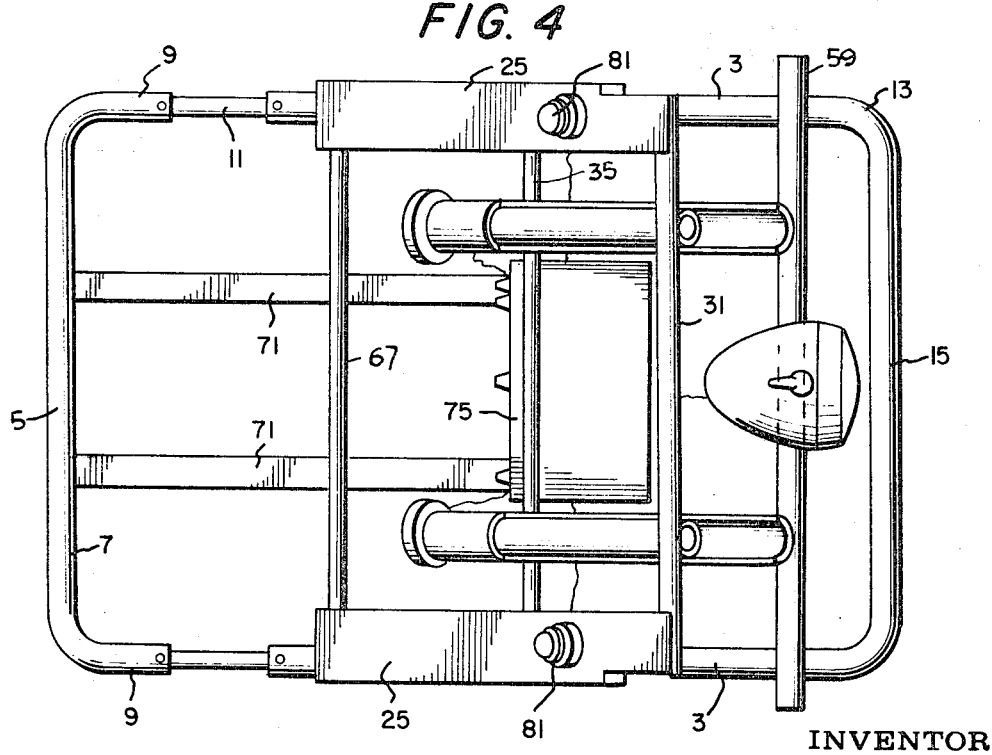
FIG. 4 is a top plan view.

I provide a pair of front supporting legs 17, having ground-engaging cups 19, which are fixed in any suitable manner on the lower ends of the legs 17. The legs extend upwardly and rearwardly, being inclined from the vertical as is clearly shown in the drawings, and adjacent to but slightly rearwardly spaced from the curved portions 13 of the forward end of arms 3, I affix by welding, bolts and nuts, or in any other suitable manner, the basic frame 1 to the legs 17 as at 21, and it will be apparent, from consideration of the drawings, that the basic frame 1 is affixed to the legs 17 at points on the legs upwardly spaced from the ground supporting cups 19. Thus, the basic frame 1 is supported on the ground or other supporting surface at its rear end by the ground supporting member 5, and the basic frame from this ground supporting member extends forwardly and upwardly because of its affixation to the legs 17 above the lower ends or cups 19 of the legs. This construction is clearly illustrated, and is apparent from the disclosure particularly shown in FIG. 2 of the drawings.

Extending upwardly and forwardly from each fore and aft extending side member 3 is an angle strap member, designated generally by the numeral 23, and this strap member 23 comprises a flat surface 25 from one edge of which a flange 27 extends downwardly at a substantially right angle to the surface 25. At its lower end each strap member 23 is fixed in any suitable manner to a side member 3, as at 26, and each strap member extends over the upper end of each leg 17 and therebeyond, and is preferably fixed to each leg by means of a bolt and nut, or the like, 29 which extends through the flange 27 and a leg.

A transverse handle and fishing pole sleeve holder stop 31 extends between the strap members 25 and is fixed at each end to the portion 33 of each strap member which extends beyond a leg.

A transversely-extending fishing pole sleeve holder rod 35 extends between and is fixed at each end to the lower surface of the strap 25, the rod 35 being spaced a substantial distance downwardly on the straps 25 relative to the handle 31. As will become apparent as this description proceeds, the fishing pole holder sleeves are pivotally mounted on the rod 35. As I have stated hereinabove, each device may be provided with one, or a plurality of fishing rod holder sleeves, and while I have illustrated in the drawings two of such sleeves it will be understood that one may be used or more than two and the device will still fall within the spirit and scope of this invention. Since each fishing pole holder sleeve is of the same construction I shall only describe one in detail in this specification. I have designated the fishing pole sleeve in its entirety by the numeral 37, and the sleeve includes an elongated tubular member 39 which is open at its forward end, as at 41, and is closed at its rear end by an audible alarm means, designated in its entirety by the numeral 43. In the drawings I have illustrated, by way of example as one type of audible alarm means which may be used, any suitable type of siren 45, which is fixed on the rear end of the tubular member 39 by means of a clamp or the like 47. Thus, it will be apparent that the rear or lower end of the tubular member 39 is closed by any suitable audible alarm means 43. Fixed, in any suitable manner, to the tubular member and extending forwardly therefrom, as at 49, is a semi-hemispherical element 51 which provides a leverage seat, which is open upwardly and is adapted, as will be explained, to receive a portion of the fishing pole which extends from the tubular member 39. The fishing pole holder or sleeve 37 is pivotally mounted on the transverse rod 35 by means of a loop 53 which is loosely wrapped around the transverse rod 35. The loop 53 which is rotatably mounted on the rod 35 is fixed to the tubular member 39 by means of a stem 55.

Each fishing pole holder 37 is releasably maintained in fully upwardly-inclined, fishing-pole-receiving operative position, as disclosed particularly in FIG. 1 of the drawings, by means of a tension spring 57 which is fixed in any suitable manner to the tubular member 39 adjacent the rear end thereof, or it may, if desired, be fixed to the clamp 47. The tension spring 57 extends forwardly from its fixed position on the tubular member 39 to a transverse rod 59 to which each spring is fixed as at 61. The transverse rod 59 extends between the side members 3 of the basic frame and is fixed thereto at each end by nuts and bolts, welding, or in any suitable manner, and it will be noticed that this transverse rod 59 extends between the side members 3 forwardly of and adjacent to the legs 17.

Rod 31 which extends transversely of the device and is fixed at each end to the extending portions 33 of the strap members 23 serves a dual function. Since this rod is the uppermost component of the device it serves as a handle for the device and it also serves as a stop means for the fishing pole sleeve holders 37. It will be apparent that the tension springs 57 which are fastened to the rear end of each fishing pole sleeve holder will urge each sleeve holder to pivot on the rod 35 to move the forward ends of the sleeve holders upwardly. This upward pivoting movement of the sleeve holders under the action of the tension springs is arrested due to the contact of each sleeve holder with and against the rod 31. The rod 31 is so positioned on the device and the various components of the device are dimensionally such that the sleeve holders are arrested in their pivoting action at a proper angle to the ground, or to the supporting surface, to maintain the fishing rods or poles in the desired operative positions.

A further transverse rod 63 extends between and is fixed to the legs 17 in any suitable manner, and rod 63 is positioned on, and extends between the legs 17 so as to be disposed a distance below each sleeve holder when they are in uppermost pivoted position in arresting engagement with the rod 31. The rod 63 is what I shall term, a rigid terminal mounting member, and fixed to the rod in position directly below each sleeve holder is a brass electric terminal 65.

I provide a transverse reinforcing rod 67 which extends between and is fixed to the lower ends of the strap members 23, and I provide a further reinforcing rod 69 which extends between and is fixed to the side fore and aft arms 3 adjacent to but rearwardly spaced from the forward ends thereof. Fixed to the reinforcing rod 69 and extending rearwardly therefrom are a pair of transversely-spaced, flexible-metal supporting members 71 which are fastened to a tackle, or the like, box 73 which may also be fixed to the ground supporting transverse member 7. The flexible supporting members 71 extend under and are fixed to the transverse reinforcing rod 67. Mounted on, fixed to and extending between the flexible metallic members 71 adjacent to and rearward with respect to transverse rod 69 is a battery case 75. Mounted on the transverse rod 59 and extending upwardly therefrom is any suitable type of lamp, or other illuminating means 77 having a control switch 79 on the upper surface thereof. The illuminating means 77 is powered from the batteries in the battery case 75 by means of a lead 83. This illuminating means may be employed when it is desired to illuminate the fish line or the caught fish which is being hauled from the water, or of course, it may be used for any other desirable purpose.

On each surface 25 of each strap 23 I provide a light 81 or any other suitable type of alarm means.

The alarm means, including the sirens or the like audible alarm means 43, and the lights or visible alarm means 81 are activated when one or more of the fishing pole holder sleeves 37 is pivoted downwardly into arresting engagement with the rod 63 and in electrical contact with each terminal 65 which is positioned on the rod 63.

When, for instance, a fish is caught by the pole operatively mounted in the fishing pole holder sleeve 37 to the right of the device when facing it from the front, and it is pivoted by the caught fish into arresting contact with the rod 63, and in contact with its respective electrical terminal 65, the siren which is mounted on the lower or rear end of that fishing pole holder sleeve will be activated, as will the light 81 which is adjacent to this particular sleeve. Since the sleeve holders are formed of metal, or other electric conducting material, the circuit is completed when a sleeve holder is in engagement with a terminal 65. This is accomplished by means of a conventional electric circuit including the light, the siren and the power source for activation thereof, comprising batteries mounted in the battery housing or case 75. Since the electric circuit which is employed does not constitute the patentable subject matter of this device, it has not been shown in detail in the drawings, and will be understood by anyone having ordinary skill in this discipline.

It is to be distinctly understood that this portable fishing pole holder and alarm can be used for fishing in boats, on docks, banks or shores of bodies of water and in substantially any place where fishing may be done.

It will also be apparent that the device is easily adaptable for various types of fishing, that is, by lengthening or shortening the legs 17 the angle of inclination of the fishing pole sleeve holders 37 may be varied.

Manifestly, the flexible strap members 71 which mount the battery case or housing 75 will cushion this housing and provide a shock-absorbing effect to ensure that the housed batteries are not damaged when the device is subjected to relatively hard and rough usage.

I claim:

1. A portable fishing pole holder and alarm, including in combination, a basic frame having front and rear ends connected together, a pair of legs adapted to be supported on their lower ends on a supporting surface and said legs being inclined rearwardly from the vertical, the rear end of said basic frame adapted to engage and be supported on the supporting surface and the forward end of said basic frame being connected to said legs at points thereon to position the front of said frame above the supporting surface, a fishing pole holder sleeve having a fishing pole receiving end, first means supported from and in position above said basic frame and extending transversely with respect thereto and pivotally supporting said fishing pole holder sleeve, said fishing pole holder sleeve extending forwardly from said first means, second means biasing said fishing pole holder sleeve into position with the fishing pole receiving end thereof extending upwardly, third means supported on and positioned above said basic frame and extending transversely with respect thereto and positioned above said first means and said fishing pole holder sleeve and in the path of pivoting action thereof, said third means engageable by said fishing pole holder sleeve in its biased pivoting action to limit the biased pivoting action of said fishing pole holder sleeve, an electrical terminal supported from said basic frame in position thereabove and below the pivoting path of said fishing pole holder sleeve, said fishing pole holder sleeve adapted to be pivoted downwardly by action of a caught fish on the fishing pole and into electrical engagement with said electrical terminal, alarm indicators electrically connected with said electrical terminal for energization when said fishing pole holder sleeve is in engagement with said electrical terminal.

2. A portable fishing pole holder and alarm in accordance with claim 1, wherein a rigid mounting member for said electrical terminal is supported on said pair of legs and extends therebetween in position above said basic frame and below said fishing pole holder sleeve.

3. A portable fishing pole holder and alarm in accordance with claim 2, wherein said fishing pole holder sleeve is formed of an electrical conductive material to complete and close the electric circuit controlling the alarm indicators when the fishing pole holder sleeve engages the electrical terminal.

4. A portable fishing pole holder and alarm in accordance with claim 1, wherein said basic frame comprises transversely spaced apart fore and aft extending members, a transversely extending rigid supporting member extending between said fore and aft extending arms and fixed thereto adjacent to but rearwardly spaced from the forward ends of said arms, a pair of transversely spaced flexible strap members fixed to said supporting member and extending rearwardly therefrom, a further supporting member extending between said fore and aft extending arms and rearwardly spaced relatively to said first mentioned transversely extending supporting member and said flexible strap members being fixed to said further supporting member, and an electric battery casing being mounted on and fixed to said flexible strap members.

References Cited

UNITED STATES PATENTS

| 2,811,801 | 11/1957 | Daniel | 43—15 |
| 2,816,388 | 12/1957 | Hartley | 43—17 |

SAMUEL KOREN, Primary Examiner

D. J. LEACH, Assistant Examiner

U.S. Cl. X.R.

43—21.2; 248—44